United States Patent [19]

Dietrich et al.

[11] Patent Number: 4,761,434

[45] Date of Patent: Aug. 2, 1988

[54] STABLE DISPERSIONS OF POLYUREAS AND/OR POLYHYDRAZODI-CARBONAMIDES IN RELATIVELY HIGH MOLECULAR WEIGHT, HYDROXYL GROUP-CONTAINING COMPOUNDS PROCESS FOR THE PRODUCTION THEREOF AND USE THEREOF FOR THE PRODUCTION OF POLYURETHANES

[75] Inventors: Manfred Dietrich; Klaus König, both of Leverkusen, Fed. Rep. of Germany

[73] Assignee: Bayer Aktiengesellschaft, Leverkusen, Fed. Rep. of Germany

[21] Appl. No.: 811,186

[22] Filed: Dec. 20, 1985

[30] Foreign Application Priority Data

Jan. 8, 1985 [DE] Fed. Rep. of Germany ....... 3500337

[51] Int. Cl.$^4$ .................... C08G 18/00; C08G 18/14
[52] U.S. Cl. ................................. 521/164; 521/128; 521/174; 521/137; 525/435; 525/456
[58] Field of Search ............... 521/164, 128, 174, 137; 525/435, 456

[56] References Cited

U.S. PATENT DOCUMENTS 4,042,537  8/1977  Dahm et al. ................. 521/174
4,089,835  5/1978  Konig et al. ................. 524/100

FOREIGN PATENT DOCUMENTS 2519004  11/1976  Fed. Rep. of Germany .
3125402   1/1983  Fed. Rep. of Germany .
1453258  10/1976  United Kingdom .

Primary Examiner—John Kight
Assistant Examiner—M. L. Moore
Attorney, Agent, or Firm—Gene Harsh; Joseph C. Gil; Lyndanne M. Whalen

[57] ABSTRACT

The present invention is directed to a stable dispersion of a polyurea and/or a polyhydrazodicarbonamide having a solids content of from 5 to 40%, by weight, in a relatively high molecular weight, hydroxyl group-containing polyether, obtained by continuously reacting:

(a) an organic di- and/or polyisocyanate with
an amine-functional material selected from the group consisting of (i) primary and/or secondary amino group-containing di- and/or polyamines, (ii) hydrazines, (iii) hydrazides and (iv) mixtures thereof in
(c) said polyether at an equivalent ratio of components (a) to (b) of from 1.051:1 to 1.50:1 in a throughflow mixer in such a quantity that the average residence time of the reaction components in the mixer is less than 10 minutes and collecting the reaction product issuing from the throughflow mixer in a receiver optionally with heating to from 50° to 150° C. and optionally with subsequent stirring. The invention also relates to the production and use of such dispersions.

10 Claims, No Drawings

STABLE DISPERSIONS OF POLYUREAS AND/OR POLYHYDRAZODI-CARBONAMIDES IN RELATIVELY HIGH MOLECULAR WEIGHT, HYDROXYL GROUP-CONTAINING COMPOUNDS PROCESS FOR THE PRODUCTION THEREOF AND USE THEREOF FOR THE PRODUCTION OF POLYURETHANES

BACKGROUND OF THE INVENTION

In the production of polyurethane products, particularly soft polyurethane foams, stable dispersions of polyureas and/or polyhydrazodicarbonamides in polyethers (so-called "PHD-polyols") have achieved worldwide importance as starting products. Complete foam seats in the automotive industry are produced from PHD-polyols, particularly in the United States of America. By using PHD-polyols, an increased foaming reliability and a more favorable hardness/bulk density ratio of the cold-form foaming qualities is achieved. According to German Pat. No. 2,513,815 (corresponding in part to U.S. Pat. No. 4,089,835), such dispersions are continuously produced, such that the reaction of organic polyisocyanates with primary and/or secondary amino group-containing polyamines and/or hydrazines and/or hydrazides in relatively high molecular weight polyols takes place in a throughflow mixer. In order to achieve the lowest possible viscosity, an equivalent ratio (NCO/NH ratio) of from 0.8:1 to 1.05:1 is maintained.

DESCRIPTION OF THE INVENTION

It has now surprisingly been found, that dispersions, which are produced using an equivalent ratio of higher than 1.05, present advantages which more than compensate for the disadvantage of increased viscosity (for the same solids content). The particle size distribution of the dispersed particles is positively influenced by an increased equivalent ratio. A relatively high equivalent ratio surprisingly leads to an enhanced finely-divided dispersion. This gives improved sedimentation stability, particularly when using polyethers containing predominantly secondary hydroxyl groups. On the other hand, due to the enhanced finely-divided nature, an equal property level of the resulting foams may be achieved with a relatively low filler content of the polyethers, such that the processing viscosities of the "filled" polyethers used are again comparable. The dispersions may thus be produced directly using a relatively low filler content or may be diluted after completion using the same or another polyether to produce the desired content. Small additions of extremely finely-divided dispersions, which may be produced using a high equivalent ratio (up to 1.5), act in the conventional foam formulations as cell-openers and thus increase the open-pored nature in a desired manner.

The present invention is thus directed to a stable dispersion of a polyurea and/or a polyhydrazodicarbonamide having a solids content of from 5 to 40%, by weight, in a relatively high molecular weight, hydroxyl group-containing polyether, obtained by continuously reacting:

(a) an organic di- and/or polyisocyanate with
(b) an amine functional material selected from the group consisting of (i) primary and/or secondary amino group-containing di- and/or polyamines, (ii) hydrazines, (iii) hydrazides and (iv) mixtures thereof in the presence of
(c) said polyether, at an equivalent ratio of the components (a) to (b) of from 1.051:1 to 1.50:1 in a throughflow mixer in such a quantity that the average residence time of the reaction components in the mixer is less than 10 minutes, and collecting the reaction product issuing from the throughflow mixer in a receiver. The product may be heated to from 50° to 150° C. in the receiver and may also be stirred therein.

The preferred stable dispersions according to the present invention are those in which the polyethers used are those wherein at least 95% by weight of the OH groups are secondary OH groups and, wherein the dispersions have a solids content of from 5 to 15%, by weight, when the equivalent ratio of components (a) to (b) is from 1.30:1 to 1.50:1 and a solids content of from 15 to 40%, by weight, when the equivalent ratio of components (a) to (b) is from 1.051:1 to 1.30:1.

Also preferred according to the present invention are stable dispersions in which the polyethers used are those wherein at least 20%, by weight, of the OH groups are primary OH groups and wherein the dispersions have a solids content of from 1 to 15%, by weight, when the equivalent ratio of components (a) to (b) is from 1.10:1 to 1.30:1 and a solids content of from 15 to 40%, by weight, when the equivalent ratio of components (a) to (b) is from 1.051:1 to 1.10:1.

Also preferred are stable dispersions where component (b) contains up to 40 mol % of alkanolamines.

The present invention also relates to a process for the production of stable dispersions of polyureas and/or polyhydrazodicarbonamides having a solids content of from 5 to 40%, by weight, in a relatively high molecular weight, hydroxyl group-containing polyether, comprising continuously reacting (a) an organic di- and/or polyisocyanate with
(b) an amine functional material selected from the group consisting of (i) primary and/or secondary amino group-containing di- and/or polyamines, (ii) hydrazines, (iii) hydrazides and (iv) mixtures thereof,
(c) said polyether at an equivalent ratio of components (a) to (b) of from 1.051:1 to 1.50:1 in a throughflow mixer, the quantity of reactants being such that the average residence time of the reaction components in the mixer is less than 10 minutes and collecting the reaction product issuing from the throughflow mixer in a receiver. The product may be heated to from 50° to 150° C. in the receiver and may also be stirred therein.

The present invention further relates to a process for the production of optionally foamed polyurethanes (particularly soft foams) by reacting polyisocyanates with relatively high molecular weight hydroxyl compounds, optionally in the presence of water and/or highly-volatile organic substances as blowing agents, optionally also with the simultaneous use of catalysts, foaming auxiliaries and additives and chain-lengthening agents and/or cross-linking agents, characterized in that the dispersions according to the present invention are used exclusively or partially as the relatively high molecular weight hydroxyl compounds.

During the reaction of the isocyanates with the amine functional material in the presence of hydroxyl group-containing polyethers, the reaction between NCO groups and amino groups is particularly favorable. The OH groups also participate in the reaction to some extent. Polyurea chains and/or polyhydrazodicarbonamide chains which are chemically linked to polyether molecules, result from this reaction. Such molecules have a dispersing effect on the filler particles. The extent of the reaction of the OH-groups in the polyaddition reaction is dependent on the reaction conditions. If too many polyether molecules react with the polyisocyanates, highly-viscous dispersions are obtained. If the quantity is too small, the danger of sedimentation exists. The process according to the present invention now allows the proportion of reacting polyether molecules to be adjusted. As mentioned above, using a relatively high equivalent ratio of (a) to (b), dispersions having a relatively high viscosity result. Thus, the equivalent ratio must be adapted to the filler content. That is, for a low filler content, a high equivalent ratio is possible and, for a higher filler content, a lower equivalent ratio is possible. Secondary hydroxyl group-containing polyethers generally allow higher equivalent ratios than polyethers having primary hydroxyl groups.

In addition to the content of primary and secondary hydroxyl groups, the functionality and the molecular weight of the polyether have an influence on the viscosity of the dispersions. As a rule, the viscosity, for a given filler content, is higher, the higher the molecular weight and functionality. As mentioned above, a certain polyether reaction is necessary for the sedimentation stability of the dispersion. It has now surprisingly been found that, at the same time as the polyether reaction increases (high equivalent ratio), the finely-divided nature of the dispersion is increased. Thus, for example, in the case of a 15% dispersion, the average particle diameter using an equivalent ratio of 0.90:1 is 0.88 μm; using an equivalent ratio of 1.0:1, 0.54 μm; using an equivalent ratio of 1.10:1, 0.46 μm; and using an equivalent ratio of 1.20:1, only 0.40 μm.

In order to improve the properties which affect the products according to the present invention as regards the production of polyurethanes therefrom, the particle size of the dispersed polyaddition product is also of importance. Thus, for example, when using dispersions herein as starting materials for the production of polyurethane foams, the diameter of the filler particles must be substantially below the cellular dimension (from 20μ to 50μ). In polyurethane coatings, the particles must likewise be sufficiently small so that coatings having a smooth surface may be obtained even in the case of very thin applications.

It is thus clear that, with increased finely-divided nature, the dispersions according to the present invention cause property improvements in the polyurethane materials produced therefrom.

Suitable starting materials are described, e.g., in U.S. Pat. No. 4,089,835, the disclosure of which is herein incorporated by reference.

As starting component (a), substantially any di- and/or polyisocyanate may be used. Such isocyanates include aliphatic, cycloaliphatic, araliphatic, aromatic and heterocyclic polyisocyanates, as described, for example, by W. Siefken in Justus Liebigs Annalen der Chemie, 562, pages 75 to 136. Examples include those corresponding to the following general formula:

wherein n=from 2 to 4, preferably 2; and

Q represents an aliphatic hydrocarbon radical having from 2 to 18 (preferably from 6 to 10) carbon atoms, a cycloaliphatic hydrocarbon radical having from 4 to 15 (preferably from 5 to 10) carbon atoms, an aromatic hydrocarbon radical having from 6 to 15 (preferably from 6 to 13) carbon atoms or an araliphatic hydrocarbon radical having from 8 to 15 (preferably from 8 to 13) carbon atoms.

Specific examples of useful isocyanates include 1,4-tetramethylene-diisocyanate; 1,6-hexamethylenediisocyanate; 1,12-dodecane-diisocyanate; cyclobutane-1,3-diisocyanate; cyclohexane-1,3- and -1,4-diisocyanate as well as mixtures thereof: 1-isocyanato-3,3,5-trimethyl-5-isocyanatomethyl-cyclohexane (German Auslegeschrift No. 1,202,785 and U.S. Pat. No. 3,401,190); 2,4- and 2,6-hexahydrotoluene-diisocyanate as well as mixtures thereof; hexahydro-1,3- and/or -1,4-phenylene-diisocyanate; perhydro-2,4'- and/or -4,4'-diphenylmethane-diisocyanate; 1,3- and 1,4-phenylene-diisocyanate; 2,4- and 2,6-toluenediisocyanate as well as mixtures thereof; diphenylmethane-2,4'- and/or -4,4'-diisocyanate; and naphthylene-1,5-diisocyanate.

The following can also be used according to the present invention: triphenylmethane-4,4',4"-triisocyanate; polyphenyl-polymethylene-polyisocyanates, such as obtained by aniline/formaldehyde condensation followed by phosgenation, and described, for example, in British Pat. Nos. 874,430 and 848,671; m- and p-isocyanatophenyl-sulphonyl-isocyanates as described in U.S. Pat. No. 3,454,606; perchlorinated arylpolyisocyanates, as described, for example, in German Auslegeschrift No. 1,157,601 (U.S. Pat. No. 3,277,138); carbodiimide group-containing polyisocyanates, as described in German Pat. No. 1,092,007 (U.S. Pat. No. 3,152,162) and in German Offenlegungsschrift Nos. 2,504,400; 2,537,685 and 2,552,350; norbornane-diisocyanates as described in U.S. Pat. No. 3,492,330; allophanate group-containing polyisocyanates, as described, for example, in British Pat. No. 994,890, Belgian Pat. No. 761,626 and Dutch Patent Application No. 7,102,524; isocyanurate group-containing polyisocyanates, as described, for example, in U.S. Pat. No. 3,001,973, in German Pat. Nos. 1,022,789; 1,222,067 and 1,027,394 and in German Offenlegungsschriften Nos. 1,929,034 and 2,004,048; acylated urea group-containing polyisocyanates as described in German Pat. No. 1,230,778; biuret group-containing polyisocyanates, as described, for example, in U.S. Pat. Nos. 3,124,605; 3,201,372 and 3,124,605, and British Pat. No. 889,050; polyisocyanates produced by telomerization reactions, as described in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polymeric fatty acid ester-containing polyisocyanates as described in U.S. Pat. No. 3,455,883. It is also possible to use isocyanate group-containing distillation residues, which occur in isocyanate production, and are optionally dissolved in one or more of the above-mentioned polyisocyanates. Moreover, it is possible to use mixtures of the above-mentioned polyisocyanates.

As a rule, the commercially available polyisocyanates are preferred; for example, 2,4- and 2,6-toluylene-diisocyanate as well as mixtures thereof ("TDI"); polyphenyl-polymethylene-polyisocyanates such as produced by aniline/formaldehyde condensation and subsequent phosgenation ("crude MDI"); and carbodiimide group-, allophanate group-, isocyanurate group-, urea group- or biuret group-containing polyisocyanates ("modified polyisocyanates"). Preferred modified polyisocyanates are those which are derived from 2,4- and/or 2,6-toluylene-diisocyanate or from 4,4'- and/or 2,4'-diphenylmethane-diisocyanate.

Component (b) comprises an amine functional material selected from the group consisting of (i) primary and/or secondary amine group containing di- and/or polyamines, (ii) hydrazines, and/or (iii) hydrazides.

Primary and/or secondary aliphatic, araliphatic, cycloaliphatic and aromatic di- and/or polyamines are generally used. Examples include ethylene diamine; 1,2- and 1,3-propylene diamine; tetramethylene diamine; hexamethylene diamine; dodecamethylene diamine; trimethyl diaminohexane; N,N'-dimethylethylene diamine; 2,2'-bis-aminopropyl-methyl amine; higher homologues of ethylene diamine, such as diethylene triamine, triethylene tetramine and tetraethylene pentamine; higher homologues of propylene-diamine such as dipropylene-triamine; piperazine; N,N'-bis-aminoethylpiperazine; triazine; 4-aminobenzylamine; 4-aminophenylethylamine; 4-amino-3,3,5-trimethyl-5-aminomethylcyclohexane; 4,4'-diaminodicyclohexylmethane and -propane; 1,4-diaminocyclohexane; phenylenediamine; naphthylene-diamine; condensates of aniline and formaldehyde; toluylene-diamines; bis-aminomethylbenzenes; and derivatives of the above-mentioned aromatic amines mono-alkylated on one or both nitrogen atoms. The polyamines will generally have molecular weights of from 60 to 1000, and preferably from 60 to 300.

Suitable hydrazines include hydrazine itself and mono- or N,N'-di-substituted hydrazines, the substituents being $C_1-C_6$ alkyl groups, cyclohexyl groups or phenyl groups. The hydrazines generally have molecular weights of from 32 to 500. Hydrazine itself is preferably used.

Suitable hydrazides include the hydrazides of di- or poly-basic carboxylic acids, such as carbonic acid, oxalic acid, malonic acid, succinic acid, adipic acid, sebacic acid, azelaic acid, maleic acid, fumaric acid, phthalic acid, isophthalic acid, and terephthalic acid; the esters of hydrazine monocarboxylic acid with di- or polyhydric alcohols and phenols such as ethanediol, propane-1,2-diol, butane-1,2-diol, -1,3 and -1,4, hexanediol, diethyleneglycol, triethylene-glycol, tetraethyleneglycol, dipropyleneglycol, tripropylene-glycol and hydroquinone; and the amides of hydrazine monocarboxylic acid (semicarbazides) with, for example, the above-mentioned di- and poly-amines. The hydrazides generally have molecular weights of from 90 to 3000, preferably from 90 to 1000.

The above-mentioned amine functional materials are optionally used in the form of commercial aqueous solutions thereof.

Ethanolamine, diethanolamine, propanolamine, dipropanolamine, butanolamine and dibutanolamine are suitable, for example, as alkanolamines.

The polyethers used herein as starting component (c) are relatively high molecular weight polyethers containing at least 1, generally from 2 to 8, and preferably from 2 to 6, hydroxyl groups, and having average molecular weights of from 200 to 16000, preferably from 500 to 12000. Such polyethers are known and are produced, for example, by polymerization of epoxides, such as ethylene oxide, propylene oxide, butylene oxide, styrene oxide or epichlorohydrin, on their own, for example, in the presence of Lewis catalysts, such as $BF_3$. Alternatively useful polyethers may be produced by addition of the above-mentioned epoxides (preferably ethylene oxide and propylene oxide) optionally in admixture or successively to starting components having reactive hydrogen atoms, such as water, ammonia, alcohols or amines. In addition to water and ammonia, useful starters include, for example, ethylene glycol; propylene glycol-(1,3) or -(1,2); trimethylolpropane; glycerol; sorbitol; 4,4'-dihydroxydiphenylpropane; aniline; ethanolamine; and ethylene diamine. Sucrose polyethers as described, for example, in German Auslegeschriften Nos. 1,176,358 and 1,064,938, as well as polyethers started on formitol or formose (German Offenlegungsschriften Nos. 2,639,083 or 2,737,951), can also be used according to the present invention. In many cases polyethers are preferred which have substantial amounts (up to 90% by weight, based on all OH-groups present in the polyether) of primary OH-groups. OH group-containing polybutadienes are also suitable according to the present invention. Hydroxy-functional polymers of tetrahydrofuran are also suitable.

The process according to the present invention also allows the partial or complete use of isocyanates or amine functional materials in which the functionality is greater than two. It is surprising that the reaction of such relatively high-functional compounds in hydroxyl group-containing polyethers does not result in solid or very highly viscous reaction products, but rather results in finely-divided, low viscosity dispersions.

The dispersed polyaddition products produced according to the present invention in hydroxyl group-containing polyethers, may also be modified by the simultaneous use of monofunctional isocyanates, amines, hydrazine derivatives or ammonia. Thus, for example, the average molecular weight of the polyaddition products may be adjusted in desired manner by incorporating such monofunctional compounds.

By using alkanolamines having primary or secondary amino groups, polyureas and polyurea-polyhydrazodicarbonamides may be formed which have free hydroxyl groups. The incorporation of other groupings, for example ester groups, relatively long aliphatic radicals, tertiary amino groups, active double bonds and, is possible, if correspondingly substituted mono- or diamines or isocyanates are also used.

The monofunctional compounds may be used according to the present invention in proportions of up to 40 mol %, preferably up to 25 mol %, (based on the total isocyanate in the case of monoisocyanates and based on the total amine functional material in the case of a monoamine, hydrazine or hydrazide).

Suitable monofunctional isocyanates include, for example, alkyl isocyanates, such as methyl-, ethyl-, isopropyl-, isobutyl-, hexyl-, lauryl- and stearyl-isocyanate; chlorohexyl-isocyanate; cyclohexylisocyanate; phenylisocyanate; tolyl;isocyanate; 4-chlorophenyl-isocyanate: diisopropylphenyl-isocyanate; and the like.

Suitable monoamines include alkyl- and di-alkylamines having $C_1-C_{18}$ alkyl groups; cycloaliphatic amines, such as cyclohexylamine and homologues thereof; aniline and N-alkylaniline; aniline derivatives substituted on the benzene nucleus; alkanolamines, such as ethanolamine, diethanolamine, propanolamine, dipropanolamine, butanolamine and dibutanolamine; and diamines having a tertiary and a primary or secondary amino group, such as N,N-dimethyl-ethylene-diamine and N-methyl-piperazine. The following are examples of suitable monofunctional hydrazine derivatives and hydrazides; N,N-dialkyl hydrazines; the hydrazides of monocarboxylic acids; hydrazine monocarboxylic acids; hydrazine monocarboxylic acid esters of monohydric alcohols or phenols; and semi-carbazides, such as methyl-, ethyl-, propyl-, butyl-, hexyl-, dodecyl-, stearyl-, phenyl- and cyclohexyl-semicarbazide.

The content of the polyaddition products in the hydroxyl group-containing polyethers (or, the solids content of the dispersion) may vary within a wide range, but is generally from 5 to 40%, by weight. The quantity of dispersed polyaddition product necessary to produce foams having optimal properties is generally from about 5 to 15%, by weight. Naturally, it is possible according to the present invention to produce such dispersions directly. For economic reasons, however, it is preferred to produce a dispersion having as high a content of polyaddition product as possible (from about 20 to 30% by weight), and then to dilute this by adding an available polyether to obtain the desired concentration.

The reaction components are generally supplied to the throughflow mixer at room temperature. Due to the shearing force (when using a dynamic mixer) and due to the reaction heat of the polyaddition, the reaction temperature can rise from 50° to 150° C. It is generally useful, however, to maintain the temperature (for example, by cooling) at less than 110° C., since otherwise any water present would evaporate and might give rise to disturbances due to bubble formation. When using hydrazine, it must be ensured that the decomposition temperature of hydrazine is not exceeded.

An important characteristic of the process is that the polyaddition reaction of polyisocyanates and polyamines, hydrazines or hydrazides is carried out in a continuous throughflow mixer with good mixing effect for an average residence time of less than 10, preferably less than 3 minutes.

The homogenizing or dispersing time should be at most 10% of the average residence time in order to achieve a thorough mixing of the components. It is possible according to the present invention, but not necessary, to use two or more throughflow mixers in succession. The above given times are applicable to such a mixing arrangement.

Regarding the throughflow mixers, a distinction may be made between static mixers having fixed assemblies and dynamic mixers having movable assemblies according to the rotor/stator principle. They may optionally be heated or cooled. The necessary mixing energy is applied in the case of the static mixers via pumps, while in the case of the dynamic mixers, a separate motor drives the rotor.

The static mixers are subdivided into:

(a) Mixers with simple fittings (for example, a helix in the case of the Static Mixer ® by Kenics Corp.) (see also U.S. Pat. Nos. 3,286,992 and 3,704,006 and German Offenlegungsschrift No. 2,119,239).

(b) Multi-channel mixer (for example AMK-Ross-ISG mixer by Aachener Misch- and Knetmaschinen-Fabrik of West Germany).

(c) So-called packing mixers, for example the static mixer by Sulzer AG (Winterthur, Switzerland) and the BMK mixer by Bayer AG of West Germany, (see, e.g., U.S. Pat. No. 3,785,620 and German Offenlegungsschrift No. 2,328,795).

(d) Mixing nozzles may be regarded as further variants of the static mixers, for example those by Lechler (Stuttgart, West Germany) or the mixing chambers in the HK-machines by Hennecke (Birlinghofen, West Germany), in which the starting products are injected in under high pressure (countercurrent injection).

The Intermixer ® by Sonic (Connecticut, USA) operates in a similar manner, in which the material to be dispersed is injected onto a movable tongue, and thereby oscillates (about 500 Hz) and thus intensively disperses or mixes the through-flowing product.

The throughflow mixers by Ekato RMT (Schopfhein, West Germany), Lightnin (Neu-Isenburg, West Germany) and Hennecke (toothed-stirrer) may be used, for example, as dynamic mixers for the process according to the present invention. These mixers operate according to the stator-rotor principle, as do the known gyratory homogenizing machines, such as for example, Supraton ® by Supraton Auer & Zucker OHG (Norf, West Germany) or Dispax-Reaktor ® by Janke & Kunkel KC (Staufen, West Germany), but can't be used to perform feed or delivery functions. The energy required for dispersion is generally from about 1 to more than 10 kW per liter of mixer volume, depending on desired particle size, the type of mixer used and the viscosity of the starting materials.

When using water-free amines, hydrazines and hydrazides, no further working-up is necessary after the polyaddition reaction has been completed. When using aqueous amines (for example, aqueous ethylene diamine solution or hydrazine hydrate) however, it is useful in some cases to remove the water from the dispersion under a vacuum.

Generally, the three components (polyether, amine-component and isocyanate) are supplied to the throughflow mixer from separate storage containers via metering pumps, where they are mixed thoroughly. At the same time most of the polyaddition reaction occurs. In order to prevent localized over-concentration, it is from time to time useful to dilute the amine component and/or the isocyanate component with quantities of the polyether component in the connected static mixers. The reacted product is transported to a receiver and, optionally to complete the reaction, is there subsequently stirred, optionally with heating to from 50° to 150° C. When using aqueous amines, the product is freed from water under a vacuum if desired.

Additives, such as activators, stabilizers, water, blowing agents, flame proofing agents, pigment pastes and the like may be added to the dispersions herein.

The dispersions produced according to the present process may be processed, for example, into soft, semi-hard or hard polyurethane foams having improved properties, such as increased resistance to tensile stress and hardness. The dispersions are likewise suitable for the production of, for example, polyurethane-based elastomers, coverings and coatings.

The process according to the present invention is illustrated in more detail by means of the following Examples. Unless otherwise indicated, parts are to be understood as parts, by weight, and percentages as %, by weight.

EXAMPLES

The abbreviations for the polyethers used in the Examples have the following meanings:

Polyether A: A polyether started on trimethylol propane of propylene oxide and ethylene oxide having an OH-number 35 and a primary OH group content of about 80% based on the total OH content.

Polyether B: A polyether started on trimethylol propane of propylene oxide and ethylene oxide having an OH number 45 and more than 95% by weight of secondary OH groups (based on total OH groups)

Polyether C: A polyether started on glycerol of propylene oxide and ethylene oxide having an OH-number 56 and about 50% of primary OH groups.

Polyether D: As Polyether A, but having an OH-number 28 and about 80% of primary OH-groups.

Polyether E: Linear polypropylene glycol (OH-number 56) having secondary OH groups.

Polyether F: Linear polypropylene glycol, terminally-modified with ethylene oxide (OH-number 28; about 80% of primary OH groups).

Polyether G: Polyethylene oxide started on trimethylol propane (OH-number 550).

EXAMPLE 1

3000 g/min of Polyether A and 225.6 g/min (4.48 mol/min) of hydrazine hydrate (63.5% of hydrazine) are continuously pumped into a static mixer, at the same time 1000 g/min of Polyether A and 856.75 g/min (4.92 mol/min) of a mixture of 80% of 2,4- and 20% of 2,6-toluylene diisocyanate are pumped through a second static mixer. The two partial flows separately reach the mixing zone of a toothed stirrer (chamber volume 0.5 liter, 5000 RPM) in which the exothermal polyaddition reaction takes place. The dispersion leaving the toothed stirrer drains into a container, where it is maintained at from 80° to 100° C. for about 2 hours with fast stirring. After stirring, the water produced from the hydrazine hydrate is distilled off under vacuum at 100° C. A stable, white, finely-divided 20% dispersion having a viscosity of 7765 mPas/25° C. is obtained. The equivalent ratio of isocyanate to hydrazine used is 1.1:1.

EXAMPLES 2-20

The following products are produced analogously to Example 1. More detailed data is given in the Table. A mixture of 80% of 2,4- and 20% of 2,6-toluylenediisocyante is used exclusively as isocyanate. Examples 1 to 18 are carried out using hydrazine hydrate, Examples 19 and 20 using ethylene diamine as amine component.

| Example | Basic Polyether | NCO/NH—ratio | % Filler | Viscosity 25° C. mPaS |
|---|---|---|---|---|
| 1 | A | 1.10 | 20 | 7765 |
| 2 | A | 1.15 | 20 | 15220 |
| 3 | A | 1.10 | 15 | 2610 |
| 4 | A | 1.15 | 15 | 3480 |
| 5 | A | 1.20 | 10 | 2820 |
| 6 | A | 1.25 | 10 | 3350 |
| 7 | A | 1.40 | 5 | 3000 |
| 8 | B | 1.15 | 20 | 3300 |
| 9 | B | 1.20 | 20 | 5400 |
| 10 | B | 1.10 | 30 | 16300 |
| 11 | C | 1.20 | 20 | 4500 |
| 12 | D | 1.10 | 15 | 3020 |
| 13 | D | 1.15 | 15 | 3790 |
| 14 | E | 1.10 | 20 | 4300 |
| 15 | E | 1.20 | 15 | 5200 |
| 16 | F | 1.10 | 20 | 7500 |
| 17 | F | 1.15 | 15 | 3700 |
| 18 | G | 1.20 | 20 | 3500 |
| 19 | A | 1.08 | 15 | 4500 |
| 20 | A | 1.10 | 15 | 6800 |
| Comparative Example according to DE-PS 2,513,815 | A | 1.00 | 20 | 3300 |

EXAMPLE 21

A mixture consisting of:
100 parts, by weight, of a dispersion (with 15% of filler) produced according to Example 4;
3.53 parts, by weight, of water;
1.2 parts, by weight, of a commercial foam stabilizer (OS 15 product of Bayer AG);
0.2 parts, by weight, of dimethyl-ethanolamine;
0.05 parts, by weight, of 1,4-diaza-bicyclo(2,2,2)octane; octane;
0.13 parts, by weight, of tin (II)-octoate;
is intensively mixed with 46.7 parts, by weight, of a toluylene diisocyanate mixture (72,5% 2,4- and 27.5% 2,6-toluylene diisocyanate) and is foamed in an open mold.

COMPARATIVE EXAMPLE 21a

The same formulation as Example 21 was used except that 100 parts, by weight, of a dispersion produced according to German Pat. No. 2,513,815 (see Table) was used as the polyol component.

| Mechanical properties | Example 21 | Comparative Example 21a according to German Patent 2,513,815 |
|---|---|---|
| Bulk density (kg/m³) | 28 | 28 |
| Resistance to tensile stress (kPa) | 135 | 130 |
| Elongation at break (%) | 175 | 160 |
| Resistance to deformation (kPa) with 40% shaping | 6.1 | 5.9 |

Use of the dispersion according to the present invention for the production of soft-elastic, stable molded foams:

| Example (data in parts, by weight) | 22 | 22a | 23 | 23a | 24 | 24a |
|---|---|---|---|---|---|---|
| Polyether D | 80 | 80 | 50 | 50 | 40 | 40 |
| PHD-dispersion according to Example 4 | 20 | — | 50 | — | 60 | — |
| PHD-dispersion according to Comparative Example according to DE-PS 2,513,815 | — | 20 | — | 50 | — | 60 |
| H₂O | 3.2 | 3.2 | 3.0 | 3.0 | 3.0 | 3.0 |
| Amine catalyst (Catalyst A 1 (UCC)) | 0.2 | 0.2 | 0.1 | 0.1 | 0.1 | 0.1 |
| Amine catalyst (Dabco 33 LV (Air Products)) | 0.5 | 0.5 | 0.3 | 0.3 | 0.5 | 0.5 |
| Polysiloxane Stabilizer (KS 43 | 1.0 | 1.0 | 1.0 | 1.0 | 1.0 | 1.0 |

-continued

| Use of the dispersion according to the present invention for the production of soft-elastic, stable molded foams: | | | | | | |
|---|---|---|---|---|---|---|
| Example | 22 | 22a | 23 | 23a | 24 | 24a |
| (Bayer AG)) TDI/MDI mixture | KZ 95 | KZ 95 | KZ 100 | KZ 100 | KZ 98 | KZ 98 |
| Bulk density (kg/m$^3$) | 34 | 34 | 50 | 50 | 42 | 42 |
| Resistance to tensile stress (kPa) | 90 | 100 | 225 | 240 | 170 | 150 |
| Elongation at break (%) | 175 | 155 | 165 | 175 | 185 | 180 |
| Resistance to deformation (50) (kPa) | 2.0 | 2.1 | 6.9 | 7.0 | 4.5 | 4/0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable dispersion of a polyurea and/or a polyhydrazodicarbonamide having a solids content of from 5 to 40%, by weight, in a relatively high molecular weight, hydroxyl group-containing polyether, obtained by continuously reacting:
   (a) an organic di- and/or polyisocyanate with
   (b) an amine-functional material selected from the group consisting of (i) primary and/or secondary amino group-containing di- and/or polyamines, (ii) hydrazines, (iii) hydrazides and (iv) mixtures thereof in
   (c) said polyether
at an equivalent ratio of components (a) to (b) of from 1.051:1 to 1.50:1 in a throughflow mixer in such a quantity that the average residence time of the reaction components in the mixer is less than 10 minutes and collecting the reaction product issuing from the throughflow mixer in a receiver.

2. The dispersion of claim 1 wherein the reaction product is heated to from 50° to 150° C. in said receiver.

3. The dispersion of claim 2 wherein said reaction product is stirred in said receiver.

4. The dispersion of claim 1, in which at least 95%, by weight, of the OH groups of said polyether are secondary, and wherein said dispersion has a solids content of from 5 to 15%, by weight, at an equivalent ratio of components (a) to (b) of from 1.30:1 to 1.50:1 and has a solids content of from 15 to 40%, by weight, at an equivalent ratio of components (a) to (b) of from 1.051:1 to 1.30:1.

5. The dispersion of claim 1, in which at least 20%, by weight, of the OH groups of said polyether are primary OH groups and wherein said dispersion has a solids content of from 5 to 15%, by weight, at an equivalent ratio of components (a) to (b) of from 1.10:1 to 1.30:1 and has a solids content of from 15 to 40%, by weight, at an equivalent ratio of components (a) to (b) of from 1.051:1 to 1.10:1.

6. The dispersion of claim 1 in which component (b) comprises up to 40 mol % of alkanol amines.

7. A process for the production of a stable dispersion of a polyurea and/or polyhydrazodicarbonamide having a solids content of from 5 to 40%, by weight, in a relatively high molecular weight, hydroxyl group-containing polyether comprising continuously reacting
   (a) an organic di- and/or polyisocyanate with
   (b) an amine functional material selected from the group consisting of (i) di-and/or polyamines, (ii) hydrazines, (iii) hydrazides and (iv) mixtures thereof in
   (c) said polyether
at an equivalent ratio of components (a) to (b) of from 1.051:1 to 1.50:1 in a throughflow mixer in such a quantity that the average residence time of the reaction components in the mixer is less than 10 minutes and collecting the reaction product issuing from the throughflow mixer in a receiver.

8. The process of claim 7 wherein the reaction product is heated to from 50° to 150° C. in said receiver.

9. The process of claim 7 wherein said reaction product is stirred in said receiver.

10. In a process for the production of a polyurethane by reacting an isocyanate with a relatively high molecular weight hydroxyl compound, the improvement wherein dispersions according to claim 1 are used exclusively or partially as the relatively high molecular weight hydroxyl compounds.

* * * * *